(12) United States Patent
Rose et al.

(10) Patent No.: US 7,090,308 B2
(45) Date of Patent: Aug. 15, 2006

(54) AXLE ASSEMBLY FOR MOUNTING A WHEEL TO A VEHICLE

(75) Inventors: Russell Rose, Manitou Springs, CO (US); Edward Herrington, Colorado Springs, CO (US); John Reid, Colorado Springs, CO (US); James Osborne, Colorado Springs, CO (US)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 10/707,157

(22) Filed: Nov. 24, 2003

(65) Prior Publication Data

US 2005/0110335 A1     May 26, 2005

(51) Int. Cl.
    *B60B 27/06* (2006.01)
    *B62K 25/02* (2006.01)

(52) U.S. Cl. .................. 301/110.5; 301/124.2

(58) Field of Classification Search .................. 301/55, 301/105.1, 110.5–110.6, 124.1–124.2; 280/279; 403/109.5, 278, 279, 281, 282, 289, 290, 403/298, 314, 320, 368, 371, 394.5, DIG. 4
See application file for complete search history.

(56) References Cited

U.S. PATENT DOCUMENTS

| | | | | |
|---|---|---|---|---|
| 622,766 A | * | 4/1899 | Harris ........................ | 403/289 |
| 711,205 A | * | 10/1902 | Goodrich .................... | 403/290 |
| 720,658 A | * | 2/1903 | Bobo ........................ | 403/290 |
| 3,807,761 A | * | 4/1974 | Brilando et al. ............ | 280/279 |
| 3,873,162 A | * | 3/1975 | Segawa .................... | 301/110.5 |
| 4,028,915 A | * | 6/1977 | Stahl ........................... | 70/233 |
| 4,789,206 A | * | 12/1988 | Ozaki ...................... | 301/124.2 |
| 5,165,762 A | * | 11/1992 | Phillips .................... | 301/110.5 |
| 5,249,879 A | * | 10/1993 | Zoor ........................ | 403/374.5 |
| 5,383,716 A | * | 1/1995 | Stewart et al. ............ | 301/124.2 |
| 5,567,020 A | * | 10/1996 | Phillips et al. ............ | 301/124.2 |
| 5,653,512 A | * | 8/1997 | Phillips .................... | 301/124.2 |
| 5,673,925 A | | 10/1997 | Stewart | |
| 5,961,186 A | * | 10/1999 | Phillips .................... | 301/124.2 |
| 6,241,322 B1 | * | 6/2001 | Phillips .................... | 301/124.2 |
| 6,260,931 B1 | * | 7/2001 | Stewart .................... | 301/124.2 |
| 6,276,760 B1 | | 8/2001 | Everett | |
| 6,454,363 B1 | * | 9/2002 | Vignocchi et al. ....... | 301/124.2 |
| 6,742,849 B1 | * | 6/2004 | Denby ...................... | 301/124.2 |

FOREIGN PATENT DOCUMENTS

JP    08 175453 A    7/1996

OTHER PUBLICATIONS

100 Years of Bicycle Component and Accessory Design, 1998, p. 51, Van Der Plas Publications, United States.

* cited by examiner

*Primary Examiner*—Jason R Bellinger
(74) *Attorney, Agent, or Firm*—Milan Milosevic; Lisa Serdynski

(57) ABSTRACT

An axle assembly connecting a wheel assembly to a vehicle frame. The axle assembly includes a tubular body having first and seconds connectable to the vehicle frame and open-ended slots disposed proximate at least one of the first and second ends of the tubular body. An expansion element is engageable with the tubular body to radially deform the tubular body at a mounting point to the vehicle frame. This configuration provides a rigid connection between the axle assembly and the vehicle frame in both the linear and radial directions.

38 Claims, 8 Drawing Sheets

AXLE ASSEMBLY FOR MOUNTING A WHEEL TO A VEHICLE

BACKGROUND OF INVENTION

The present invention relates to axle assemblies for mounting wheel hubs to handlebar-steered vehicles, and more particularly to an axle assembly that securely mounts a wheel hub to a suspension fork to provide a torsionally stiffer front suspension assembly.

Typically, in handlebar-steered vehicles like bicycles and motorcycles, an axle assembly is used to mount a wheel hub to a fork. The fork includes parallel legs that extend upward from each side of the axle and connect at the top of the wheel at a central steering tube that forms part of the bicycle or motorcycle frame. The bottom end of the fork legs are typically u-shaped or annular dropouts shaped for receiving the axle assembly. The axle may be mounted to the dropouts with a quick-release mounting device. Such devices facilitate removal of the wheel for repairs, transport, storage, etc.

During a typical ride, a rider will encounter irregularities in the terrain that are transmitted through the wheel and fork to the handlebars. The rider may counteract these irregularities by steering. For the steering to be effective, it must be transmitted as directly as possible to the wheel. For this to occur, the wheel must be securely and rigidly mounted to the fork assembly.

Terrain irregularities create high loads at the front wheel/axle/fork interface, loads that are further heightened in off-road bikes, requiring even higher torsional rigidity at the wheel/fork/axle interface. To meet these heightened needs, bicycle axle design has slowly migrated toward motorcycle axle design. However, bicycle axles still need to avoid the drawbacks of increased weight and higher cost inherent to motorcycle axles, while continuing to embrace a tool-less, quick-release design.

SUMMARY OF INVENTION

One object of the present invention is to provide an axle assembly that provides a very rigid interface between the fork and the axle, providing sufficient torsional stiffness for off-road riding.

Another object of the present invention is to provide an axle assembly permitting tool-less mounting and dismounting of the axle assembly to the fork.

Another object of the present invention is to provide an axle assembly including fewer components to reduce weight and cost.

The present invention provides an axle assembly for mounting a wheel hub assembly to a vehicle frame. The axle assembly includes a tubular body, a lever actuator, and a follower assembly. The tubular body having first and second ends mountable to the vehicle frame, at least one of the ends of the tubular body configured to be radially deformable, using open-ended slots, to seize against the vehicle frame. The follower assembly is disposed proximate one of the first and second ends of the tubular body and is axially displaceable relative to the tubular body in response to pivoting of the lever actuator. The follower assembly is configured to radially deform one of the first and second ends of the tubular body in response to displacement of the follower assembly by the lever actuator.

In one embodiment of the invention, the follower assembly may include an expander element disposed proximate one of the first and second ends of the tubular body, the expander shaped to radially deform one of the first and second ends of the tubular body in response to axial displacement of the follower assembly by the lever actuator.

In another embodiment of the invention, the follower assembly may further include a linking member operably connecting the lever actuator to the expander element.

In another embodiment of the invention, the follower assembly may include a second expander element disposed proximate the other of the first and second ends of the tubular body, the second expander element being opposably displaceable relative to the first expander element and shaped to radially deform the other of the first and second ends of the tubular body in response to axial displacement of the follower assembly by the lever actuator.

In yet another embodiment of the invention, the follower assembly may further include a barrel rotatably received by the lever actuator, the barrel eccentrically disposed within the lever actuator so as to axially displace the follower assembly in response to pivoting of the lever actuator.

In another embodiment of the invention, the lever actuator may include a cam configured to axially displace the follower assembly in response to pivoting of the lever actuator.

These and other features and advantages of the invention will be more fully understood from the following description of various embodiments of the invention, taken together with the accompanying drawings.

DETAILED DESCRIPTION

Figure 1:
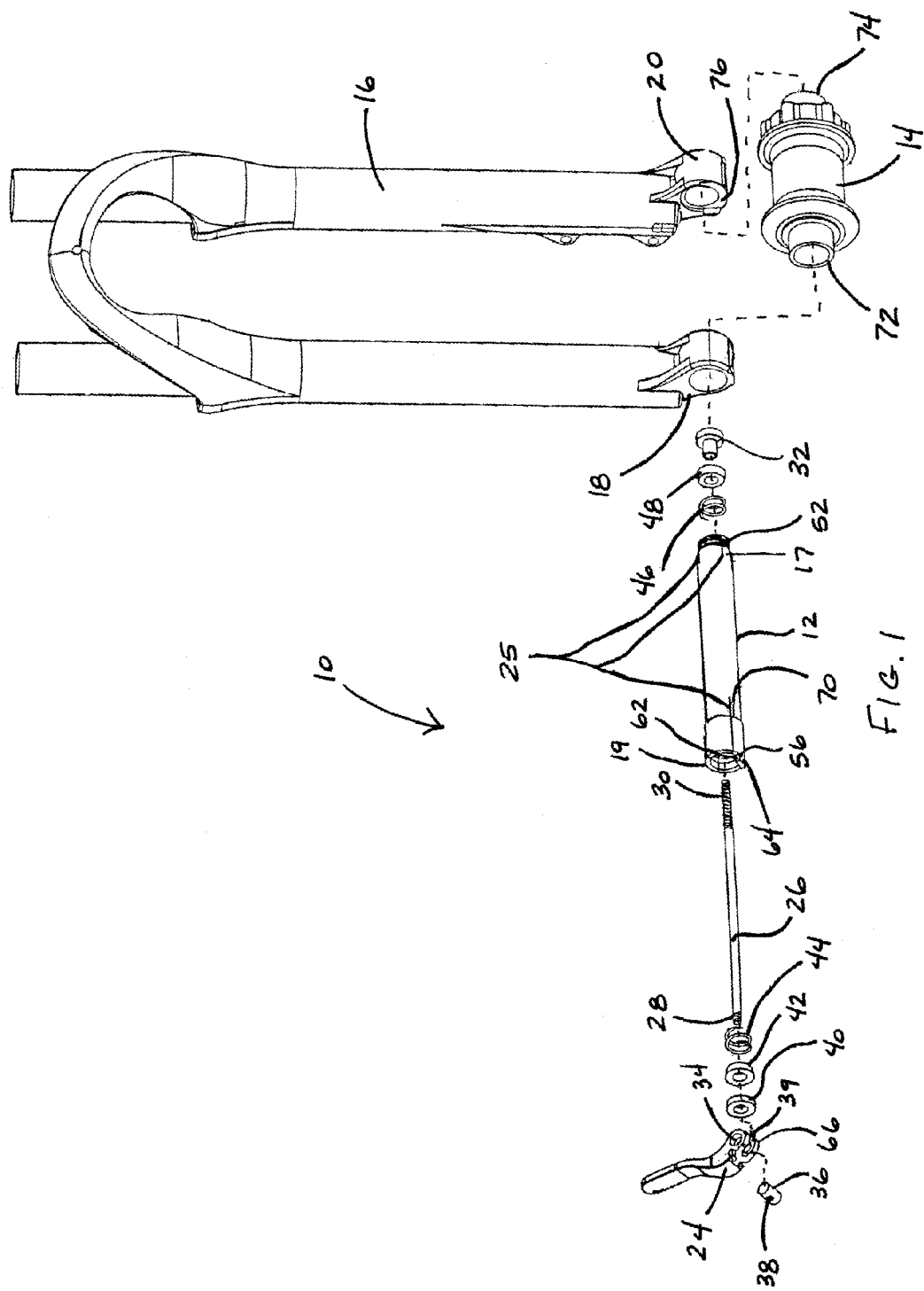
FIG. 1 is an exploded perspective view of an axle assembly in accordance with one embodiment of the present invention, including a wheel hub and front fork.
Figure 2:
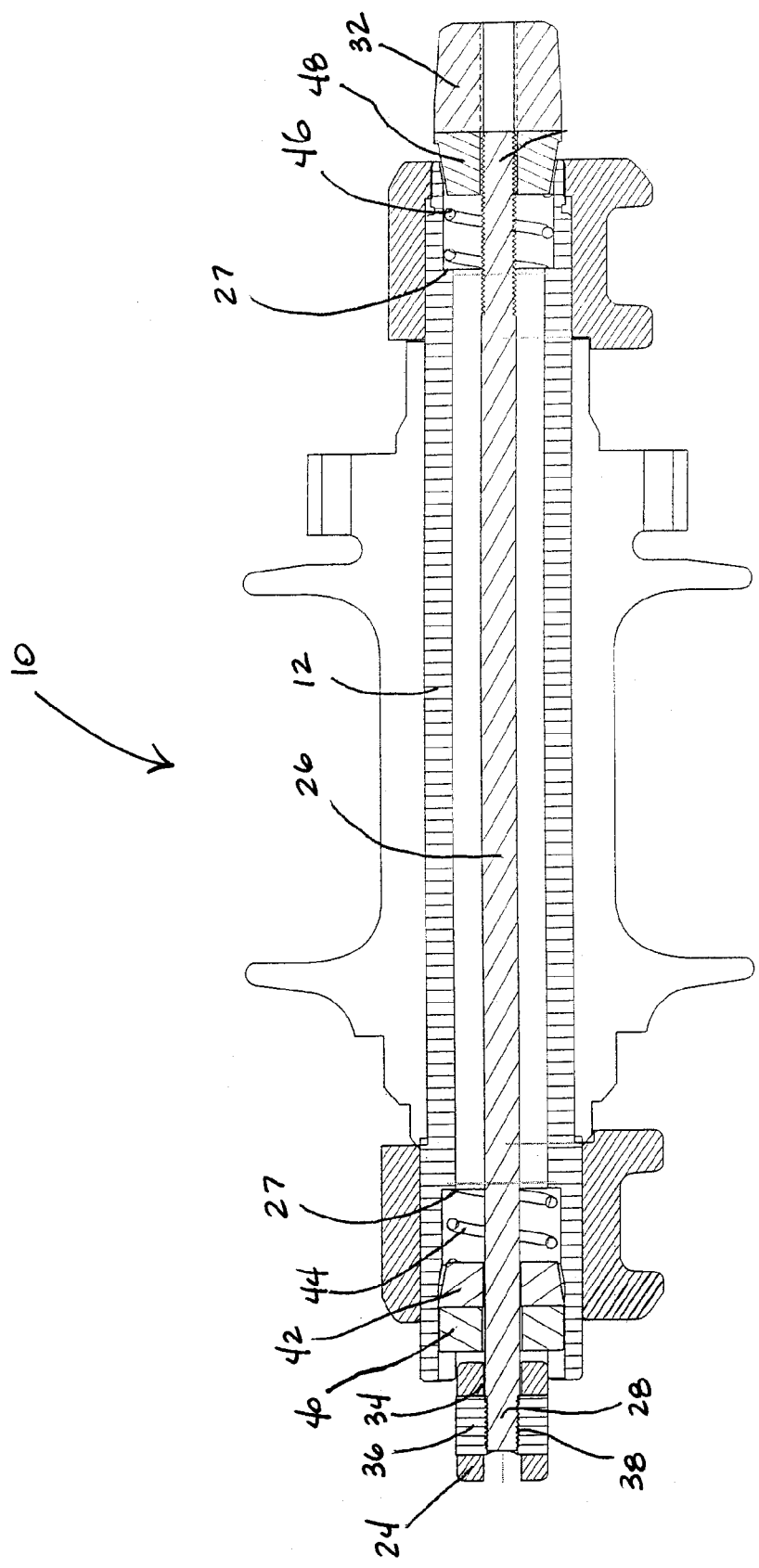
FIG. 2 is a cross-section of the wheel assembly of FIG. 1.

Looking to FIGS. 1–6, a first embodiment of an axle assembly according to the present invention is designated generally by the reference number 10. The axle assembly 10 connects a front wheel hub 14 of a bicycle to a front suspension fork 16. Alternatively, the axle assembly 10 may be used to connect a rear wheel to a bicycle frame or a motorcycle wheel to a motorcycle frame. The axle assembly 10 extends coaxially through the wheel hub 14, mounting to dropouts 18, 20 of the suspension fork 16. The axle assembly generally includes a tubular body 12 having first and second ends 17, 19. The wheel hub 14 mounts rotatably on the tubular body 12, and the first and second ends 17, 19 of the tubular body mount to the dropouts 20, 18 of the fork 16.

In the embodiment of FIGS. 1–6, the first end 17 of the tubular body 12 is threaded into the dropout 20 of the fork 16, while the second end 19 of the tubular body 12 is associated with a clamp lever 24 configured to pivotably clamp the axle assembly 10 to the fork dropouts 18, 20, to create a rigid connection between the axle assembly 10 and the fork suspension 16.

The tubular body 12 has open-ended slots 25 that are located at both ends 17, 19 of the embodiment shown. In other embodiments, slots may be located at only one end of the tubular body. Additionally, only a single slot may be used. Of course, the slot(s) may assume any shape that permit the ends 17, 19 of the tubular body 12 to be radially deformable. The tubular body 12 encloses a rod or a skewer 26 having a first end 28 attached to a clamp lever 24 and a second end 30 connected—in this embodiment, threaded— to a locknut 32. A thrust washer 40 and a first expansion washer 42 are coaxially and slidably mounted over the end 28 of the skewer 26. The first expansion washer 42 is wedge-shaped, the larger diameter positioned closer to the clamp lever 24. Disposed between the first expansion washer 42 and the tubular body 12 is a first return spring 44, also coaxially mounted on the skewer 26, for biasing the washer 42 away from the tubular body 12. A second expansion washer 48, shaped similar to the first expansion washer 42, is located at the other end 30 of the skewer 26, the smaller diameter of the second expansion washer 48 opposably oriented toward the smaller diameter of the first expansion washer 42. The expansion washers 42, 48 are shaped to radially deform the tubular body 12 upon axial displacement of the expansions washers 42, 48 within the tubular body 12. Accordingly, they can assume any number of alternative shapes. A second return spring 46, disposed between the tubular body 12 and the second expansion washer 48 biases the second expansion washer 48 away from the tubular body. The first and second return springs 44, 46 are axially restrained by shoulders 27 in the tubular body 12. The locknut 32 is threaded onto the end 30 of the skewer 26 and is adjacent to the second expansion washer 48.

The clamp lever 24 includes a bore 34 for receiving a pivot barrel 36. The pivot barrel 36 is free to rotate within the bore 34 of the clamp lever 24 and has a threaded hole 38 for attachment to the skewer 26. The skewer 26 extends through a slot 39 in the clamp lever 24 and is threaded into the threaded hole 38 of the pivot barrel 36. Preferably, the thread length on the skewer 26 is such that it bottoms out upon full engagement with the pivot barrel 36.

The clamp lever 24 further includes an integrated cam 66 eccentrically disposed about the bore 34. When the clamp lever 24 is pivoted about the barrel 36, the cam 66 bears against the thrust washer 40 to axially push the thrust washer 40 and the first expansion washer toward the tubular body, while at the same time, the barrel 36 pulls on the skewer 26, thereby also pulling the second expansion washer 48 opposably toward the tubular body 12 as well. As the first and the second expansion washers 42, 48 are opposably pushed and pulled toward the center of the tubular body 12 and into engagement with the first and second ends 17, 19 of the tubular body 12, the expansion slots 25 are outwardly radially deformed outwardly to increase the diameter of the tubular body 12 at the fork dropouts 18, 20, causing the tubular body 12 to seize securely against the dropouts.

The clamping force provided by the clamp lever 24 and the length of the axle assembly 10 may be adjusted by moving the locknut 32 up or down along the threads of the skewer 26. For example, by turning the locknut 32 clockwise, the clamping force is increased between the tubular body 12 and the fork 16, and by turning the locknut 32 counterclockwise, the clamping force is decreased between the tubular body 12 and the fork 16. The initial location of the locknut 32 may be set by the manufacturer so as to provide adequate clamping force once installed on the bicycle. However, this configuration gives the cyclist the option to adjust the location of locknut 32.

Figure 3A:
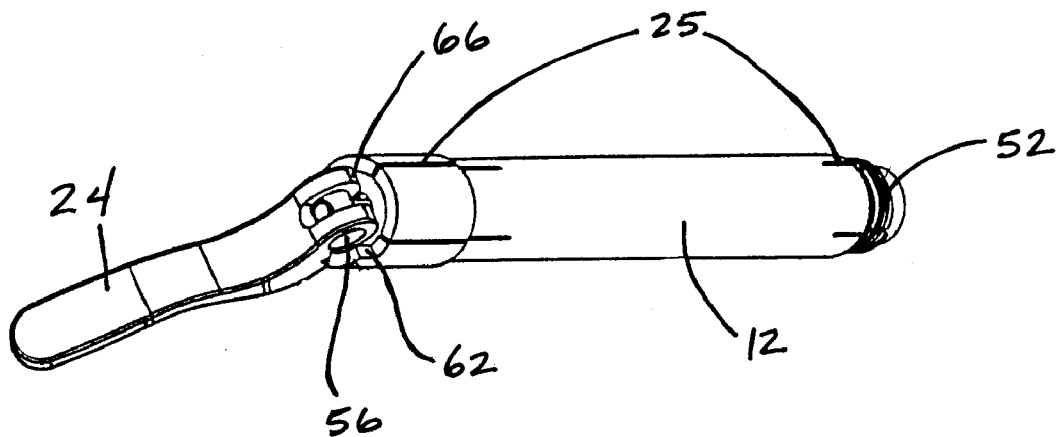
FIG. 3 is a perspective view of a clamp lever assembled to a tubular body of the axle assembly of FIG. 1.
Figure 3B:
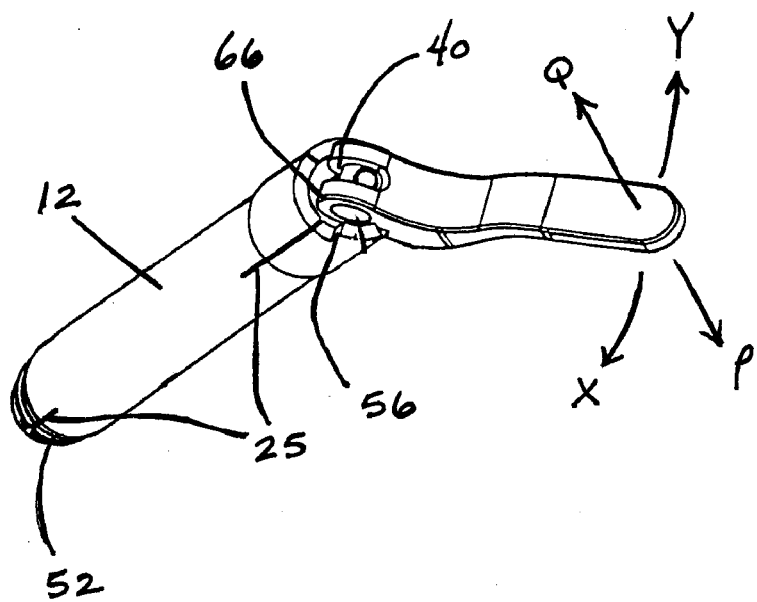
Figure 4:
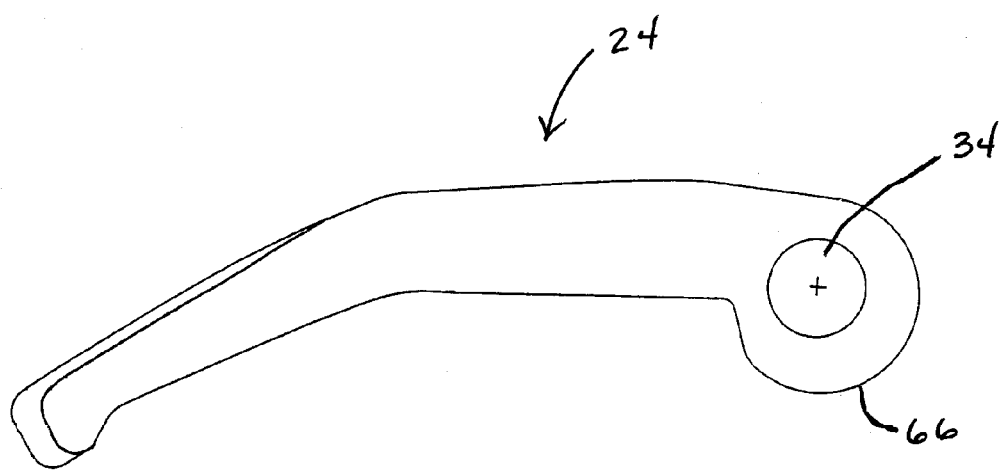
FIG. 4 is a side elevational view of the clamp lever of FIG. 1.

A bi-directional drive clement 56 may be located at the end 19 of the tubular body 12 to allow the axle assembly 10 to be rotated clockwise or counterclockwise. The bi-directional element 56 is preferably a projection or a tab integrated with the tubular body. The clamp lever 24 may be positioned to contact either a first or second side 62, 64, respectively, of the bi-directional drive element 56 to rotate the axle assembly 10 clockwise (FIG. 3b) or counterclockwise (FIG. 3a).

Figure 5:
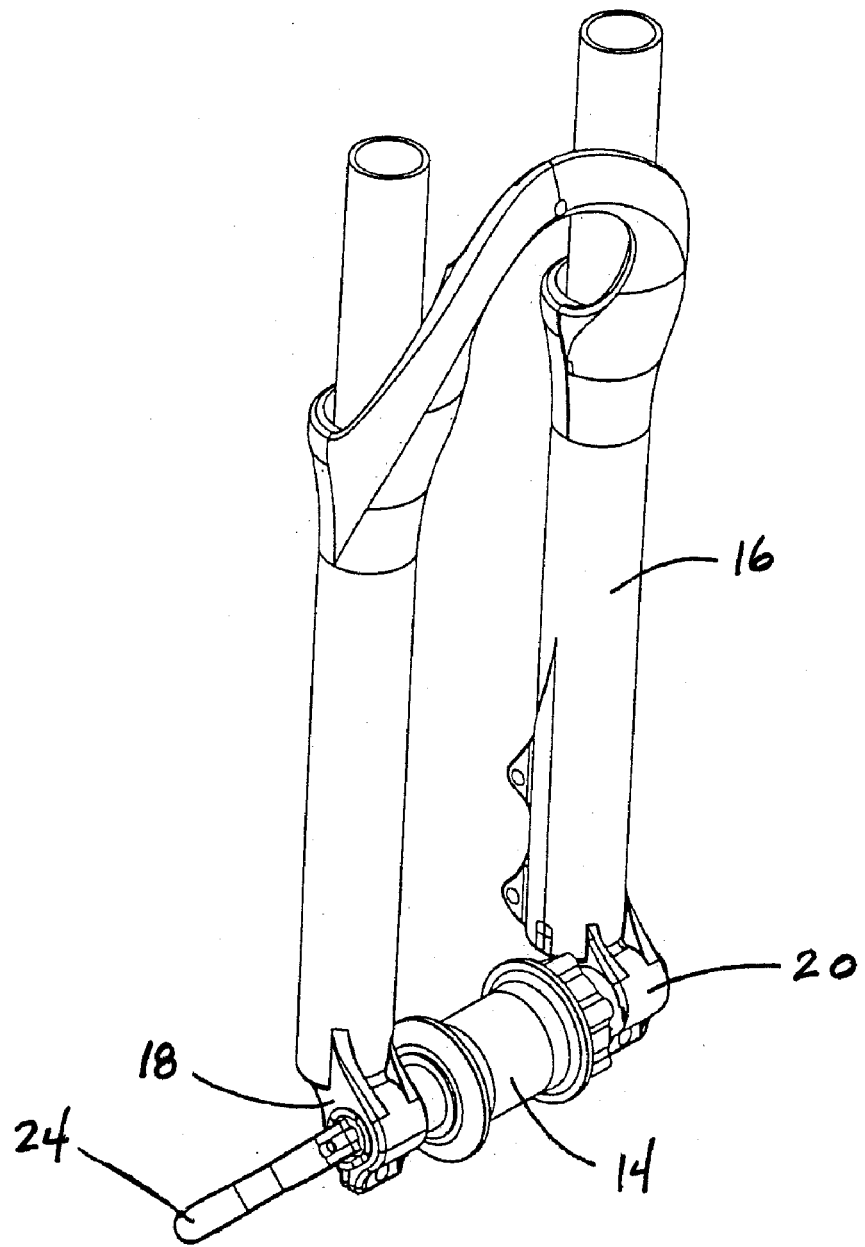
FIG. 5 is a perspective view of the axle assembly of FIG. 1 showing in particular, a wheel hub mounted to a front fork.
Figure 6:
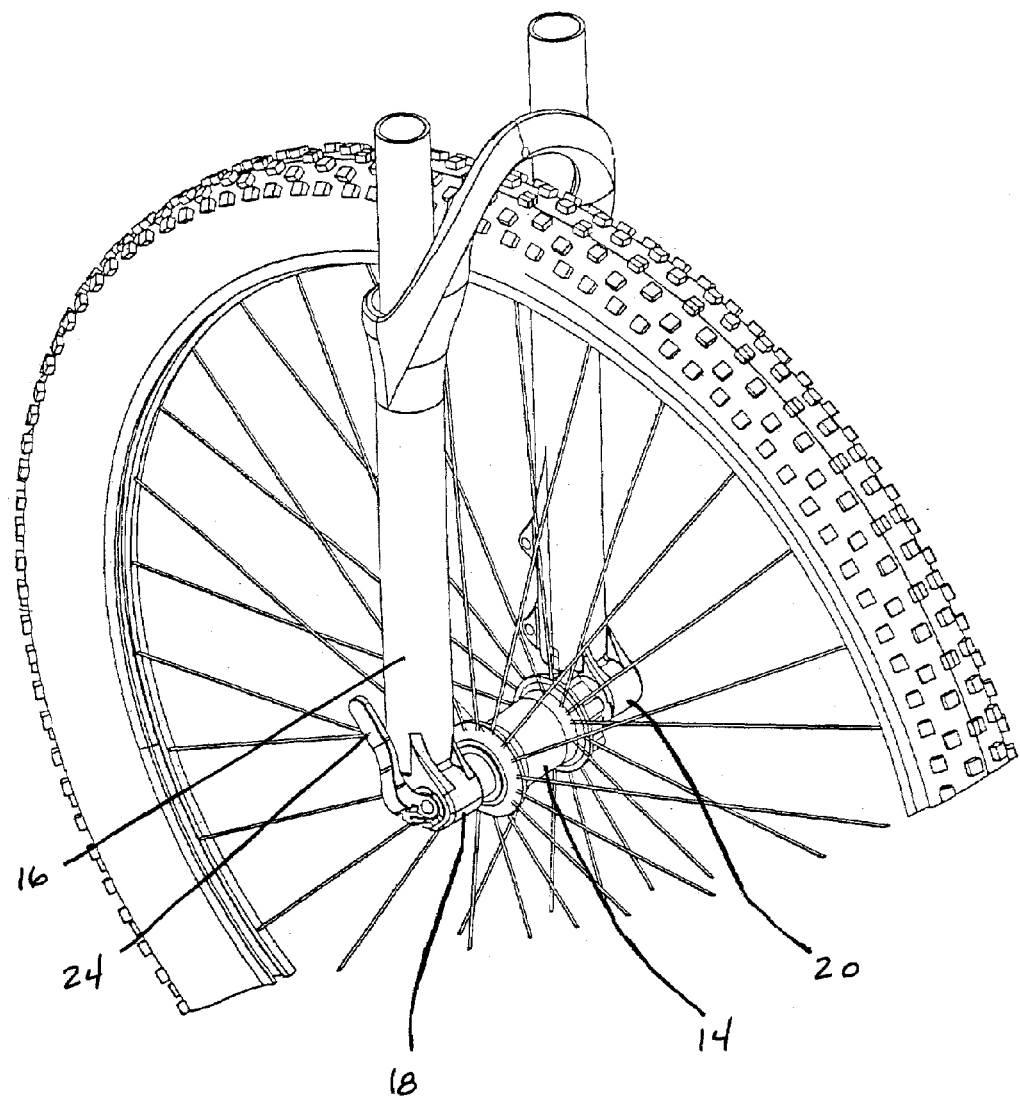
FIG. 6 is a perspective view of the axle assembly of FIG. 1 showing in particular, a wheel hub including a wheel mounted to a front fork, with the clamp lever in a closed position.

To mount the axle assembly 10 on a bicycle, the clamp lever 24 is positioned in an open position, with the clamp lever pivoted away from the fork fork 16, as shown in FIG. 5. When the clamp lever 24 is open, the expansion washers 42, 48 are axially biased toward the opposing ends 17, 19 of the tubular body 12, respectively, by the return springs 44, 46 which allows the axle assembly 10 to freely slide into the fork dropouts 18, 20. The axle assembly 10 is axially inserted through the first fork dropout 18, the hub 14 and then into the second fork dropout 20. Next, the clamp lever 24 is rotated until the tubular body 12 is completely threaded into the second fork dropout 20. As the tubular body 12 is threaded into the fork dropout 20, a shoulder 70 of the tubular body 12 contacts an end 72 of the hub 14, as another end 74 of the hub 14 contacts a side 76 of the fork dropout 20 thereby securely seating the tubular body 12 and the hub 14 axially to the fork dropout 20. Once the tubular body 12 is securely threaded to the fork dropout 20 axially, the clamp lever 24 is pivoted to a closed position toward the fork 16 (FIG. 6) which drives the first and second expansion washers 42, 48 opposably toward each other, thereby radially deforming the ends 17, 19 of the tubular body 12 to securely clamp the tubular body 12 to the fork dropouts 18, 20. The axle assembly 10 is now rigidly connected to the fork dropouts 18, 20 in both the axial and radial directions. As shown in FIG. 3a, the clamp lever 24 is rotated in the directions X and Y to thread and unthread the tubular body 12 to and from the dropout 20, and pivoted in the directions P and Q to clamp and unclamp the axle assembly 10 to and from the fork dropouts 18, 20.

In the embodiment of FIGS. 1–6, a pair of opposably displaceable expansion washers 42, 48 are used to radially deform both ends 17, 19 of the tubular body 20. As the first expansion washer 42 is displaced axially by the cam 66 of the clamp lever 24, and the second expansion washer 48 is displaced by the skewer 26, in turn, also displaced by the lever actuator 24, the expansion washers 42, 48 and the skewer 26 form a follower assembly responsive to the pivoting motion of the lever actuator 24.

Figure 7:
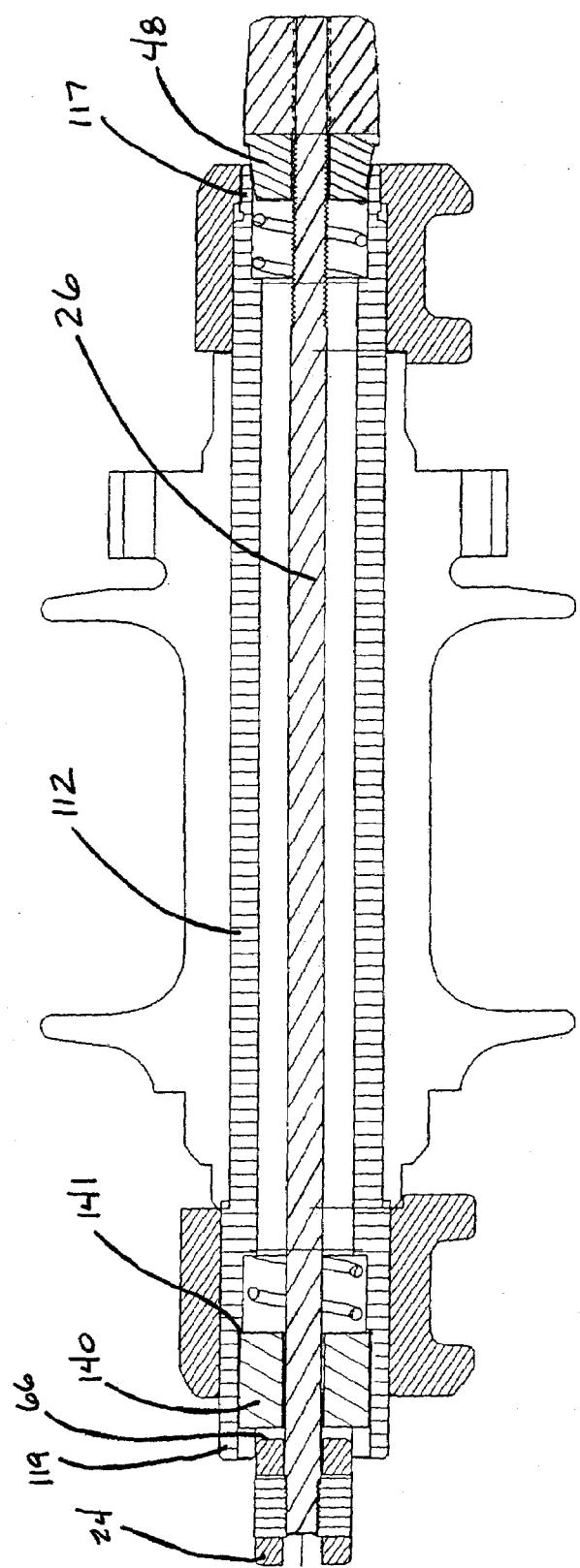
FIG. 7 is a cross-section of another embodiment of the present invention, showing in particular, a follower assembly including a single explander element with a linking member.

In an alternative embodiment of the invention, shown in FIG. 7, the sliding thrust washer 40 and sliding first expansion washer 42 of the embodiments of FIGS. 1–6 are replaced by a thrust washer 140 that is axially restrained by a shoulder 141 of a tubular body 112 located near a second end 119 of the tubular body 112. Upon pivoting of the lever actuator 24 toward its closed position (FIG. 6), the cam 66 now bears against the axially fixed thrust washer 140 to pull the skewer 26 axially, drawing the second expansion washer 48 inwardly to radially deform the tubular body 112 at its first end 117. Accordingly, in the embodiment of FIG. 7, the second expansion washer 48 and skewer 26 form a follower assembly responsive to the pivoting motion of the lever actuator 24.

Figure 8:
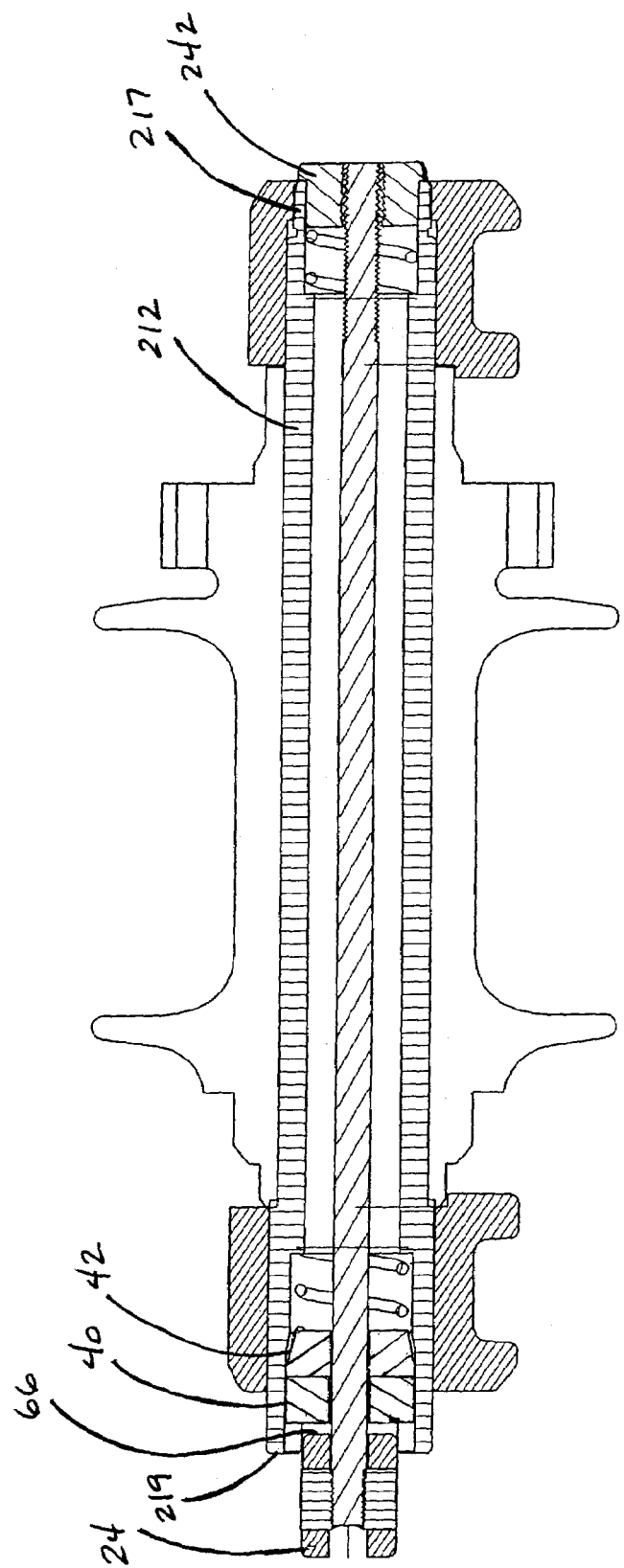
FIG. 8 is a cross-section of yet another embodiment of the present invention, showing in particular, a follower assembly including a single expander element.

In a further embodiment of the invention, shown in FIG. 8, the second expansion washer 48 of the embodiment of FIGS. 1–6 is replaced by a locknut 242 that is axially restrained against the first end 217 of the tubular body 212. Upon pivoting of the lever actuator 24 toward its closed position (FIG. 6), the cam 66 bears against the sliding thrust washer 40 to displace the thrust washer and the first expansion washer 42 inwardly to radially deform the tubular body 212 at its second end 219. Accordingly, in the embodiment of FIG. 8, the first expansion washer 42 forms a follower assembly responsive to the pivoting motion of the lever actuator 24.

While this invention has been described by reference to the embodiments shown, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. An axle assembly for mounting a wheel hub to a vehicle frame comprising:
    a tubular body having first and second ends mountable to the vehicle frame, the first and second ends configured to be radially deformable to secure the tubular body to the vehicle frame, the tubular body including an open-ended slot disposed at each of the first and second ends of the tubular body;
    a lever actuator; and
    a follower assembly including a first expander element disposed proximate one of the first and second ends of the tubular body and a second expander element disposed proximate the other of the first and second ends of the tubular body, the first and second expander elements axially displaceable relative to the tubular body in response to pivoting of the lever actuator, the first and second expander elements configured to radially deform the first and second ends of the tubular body in response to displacement of the follower assembly by the lever actuator.

2. The axle assembly of claim 1, wherein the tubular body includes a plurality of open-ended slots disposed at one of the first and second ends of the tubular body.

3. The axle assembly of claim 1, wherein the lever actuator comprises a cam configured to axially displace the follower assembly in response to pivoting of the lever actuator; and the first expander element shaped to radially deform one of the first and second ends of the tubular body in response to axial displacement of the follower assembly by the cam.

4. The axle assembly of claim 3, wherein the tubular body includes a plurality of open-ended slots disposed at one of the first and second ends of the tubular body.

5. The axle assembly of claim 4, wherein the first expander element is wedge-shaped.

6. The axle assembly of claim 3, wherein the follower assembly further comprises a barrel rotatably received by the lever actuator, the barrel eccentrically disposed within the lever actuator such that the cam axially displaces the follower assembly in response to pivoting of the lever actuator.

7. The axle assembly of claim 6, further comprising a first spring disposed between the tubular body and the first expander element, the spring configured to bias the first expander element away from the tubular body.

8. The axle assembly of claim 7, wherein the tubular body includes a plurality of open-ended slots disposed at one of the first and second ends of the tubular body.

9. The axle assembly of claim 3, wherein the follower assembly further comprises a linking member operably connecting the cam to the first expander element.

10. The axle assembly of claim 9, wherein the follower assembly further comprises a barrel rotatably received by the lever actuator, the barrel eccentrically disposed within the lever actuator so as to axially displace the follower assembly in response to pivoting of the lever actuator.

11. The axle assembly of claim 10 further comprising a first spring disposed between the tubular body and the first expander element, the spring configured to bias the first expander element away from the tubular body.

12. The axle assembly of claim 11, wherein the tubular body includes a plurality of open-ended slots disposed at one of the first and second ends of the tubular body.

13. The axle assembly of claim 9, wherein, the second expander element opposably displaceable relative to the first expander element and shaped to radially deform the other of the first and second ends of the tubular body in response to axial displacement of the follower assembly by the cam.

14. The axle assembly of claim 13, wherein the follower assembly further comprises a barrel rotatably received by the lever actuator, the barrel eccentrically disposed within the lever actuator so as to axially displace the follower assembly in response to pivoting of the lever actuator.

15. The axle assembly of claim 14 further comprising a second spring disposed between the tubular body and the second expander element, the second spring configured to bias the second expander element away from the tubular body.

16. The axle assembly of claim 15, wherein the tubular body includes a plurality of open-ended slots disposed at the other of the first and second ends of the tubular body.

17. The axle assembly of claim 16, wherein the tubular body further includes an extension tab protruding from one of the first and second ends of the tubular body, the extension tab disposed proximate the lever actuator so as to be engageable thereby to rotate the tubular body in one of a first and second direction.

18. The axle assembly of claim 8, wherein the tubular body further includes an extension tab protruding from one of the first and second ends of the tubular body, the extension tab disposed proximate the lever actuator so as to be engageable thereby to rotate the tubular body in one of a first and second direction.

19. The axle assembly of claim 12, wherein the tubular body further includes an extension tab protruding from one of the first and second ends of the tubular body, the extension tab disposed proximate the lever actuator so as to be engageable thereby to rotate the tubular body in one of a first and second direction.

20. An axle assembly for mounting a wheel hub to a vehicle frame comprising:
    a tubular body having first and second ends mountable to the vehicle frame, one of the first and second ends configured to be radially deformable to secure the tubular body to the vehicle frame, the tubular body including an open-ended slot disposed at one of the first and second ends of the tubular body;
    a lever actuator;
    a follower assembly including a first expander element disposed proximate one of the first and second ends of the tubular body and axially displaceable relative to the tubular body in response to pivoting of the lever actuator, the first expander element configured to radially deform one of the first and second ends of the tubular body in response to displacement of the first expander element by the lever actuator; and a first spring configured to resist displacement of the first expander element by the lever actuator.

21. The axle assembly of claim 20, wherein the tubular body includes a plurality of open-ended slots disposed at one of the first and second ends of the tubular body.

22. The axle assembly of claim 20, wherein the lever actuator comprises a cam configured to axially displace the follower assembly in response to pivoting of the lever actuator, the first expander element shaped to radially deform one of the first and second ends of the tubular body in response to axial displacement of the follower assembly by the cam.

23. The axle assembly of claim 22, wherein the tubular body includes a plurality of open-ended slots disposed at one of the first and second ends of the tubular body.

24. The axle assembly of claim 20, wherein the first expander element is wedge-shaped.

25. The axle assembly of claim 22, wherein the follower assembly further comprises a barrel rotatably received by the lever actuator, the barrel eccentrically disposed within the lever actuator such that the cam axially displaces the follower assembly in response to pivoting of the lever actuator.

26. The axle assembly of claim 20, wherein the first spring is disposed between the tubular body and the first expander element, the first spring configured to bias the first expander element away from the tubular body.

27. The axle assembly of claim 26, wherein the tubular body includes a plurality of open-ended slots disposed at one of the first and second ends of the tubular body.

28. The axle assembly of claim 22, wherein the follower assembly further comprises a linking member operably connecting the cam to the first expander element.

29. The axle assembly of claim 28, wherein the follower assembly further comprises a barrel rotatably received by the lever actuator, the barrel eccentrically disposed within the lever actuator so as to axially displace the follower assembly in response to pivoting of the lever actuator.

30. The axle assembly of claim 29, wherein the first spring is disposed between the tubular body and the first expander element, the spring configured to bias the first expander element away from the tubular body.

31. The axle assembly of claim 30, wherein the tubular body includes a plurality of open-ended slots disposed at one of the first and second ends of the tubular body.

32. The axle assembly of claim 22, wherein the follower assembly further comprises a second expander element disposed proximate the other of the first and second ends of the tubular body, the second expander element opposably displaceable relative to the first expander element and shaped to radially deform the other of the first and second ends of the tubular body in response to axial displacement of the follower assembly by the cam.

33. The axle assembly of claim 32, wherein the follower assembly further comprises a barrel rotatably received by the lever actuator, the barrel eccentrically disposed within the lever actuator so as to axially displace the follower assembly in response to pivoting of the lever actuator.

34. The axle assembly of claim 32 further comprising a second spring disposed between the tubular body and the second expander element the second spring configured to bias the second expander element away from the tubular body.

35. The axle assembly of claim 34, wherein the tubular body includes a plurality of open-ended slots disposed at the other of the first and second ends of the tubular body.

36. The axle assembly of claim 35, wherein the tubular body further includes an extension tab protruding from one of the first and second ends of the tubular body, the extension tab disposed proximate the lever actuator so as to be engageable thereby to rotate the tubular body in one of a first and second direction.

37. The axle assembly of claim 27, wherein the tubular body further includes an extension tab protruding from one of the first and second ends of the tubular body, the extension tab disposed proximate the lever actuator so as to be engageable thereby to rotate the tubular body in one of the first and second direction.

38. The axle assembly of claim 31, wherein the tubular body further includes an extension tab protruding from one of the first and second ends of the tubular body, the extension tab disposed proximate the lever actuator so as to be engageable thereby to rotate the tubular body in one of a first and second direction.

* * * * *